Patented July 23, 1940

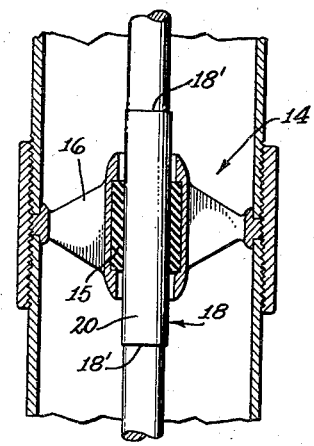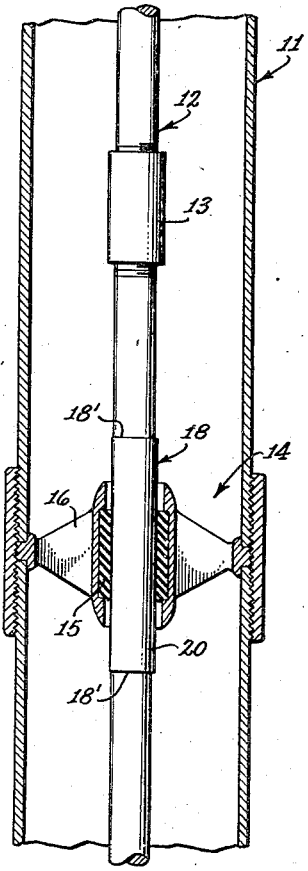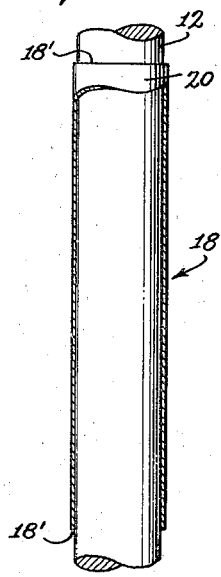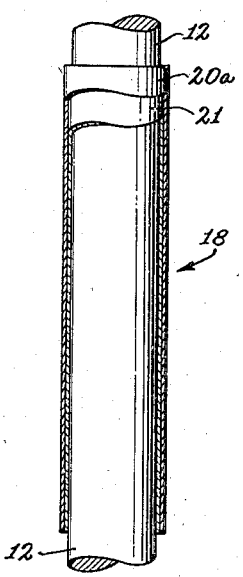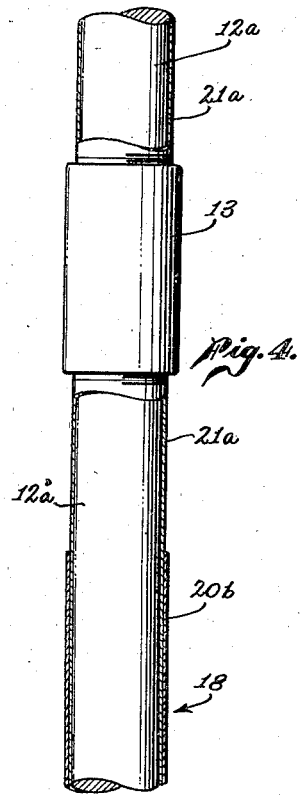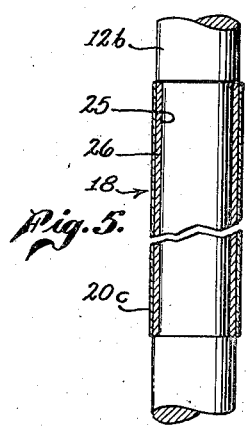

2,208,975

UNITED STATES PATENT OFFICE 2,208,975

OPEN LINE SHAFT BEARING

James M. Hait, Los Angeles, Calif., assignor to Food Machinery Corporation, a corporation of Delaware Application September 19, 1938, Serial No. 230,621

4 Claims. (Cl. 308—238)

This invention relates generally to deep well turbine pumps and particularly to the line shaft bearings of such pumps.

Many types of deep well water turbine pumps are provided with what is termed an open line shaft which extends from the surface of the ground down to the impellers of the pump. By "open line shaft" is meant that the shaft is exposed to the pumped fluid column and no means is provided for enclosing it. With this type of line shaft it is the usual practice to employ bearings which are lubricated by the pumped liquid and any sand or other particles carried by the water are free to enter the bearings. Since sand is present in various amounts in the pumped well water of nearly all wells, there is an acute problem of providing bearings which will not be cut out or worn out quickly by the abrasive effect of sand particles carried by the water.

It is common practice to employ resilient or flexible rubber bearings, that is rubber sleeves, in which the shaft is adapted to rotate. While the rubber bearing sleeves do not wear appreciably, it has been found that the shaft bearing portions soon wear and become scored by the abrasive action of the sand particles. Although the problem of designing a durable bearing for the open line shafts of pumps has been known for several years and competent engineers have worked on the problem there has not yet been produced, to the best of my knowledge, a bearing which will effectively resist the abrasive effects of the sand laden fluid.

Therefore, it is a primary object of this invention to provide a bearing construction for the open line shaft of a deep well turbine pump which will withstand over long periods of use the abrasive effect of the sand particles carried by the pumped fluid.

In deep well turbine pumps it is essential that the line shaft be flexible in order to absorb the torque load and the thrust load which is placed upon it. It is also necessary that in order to have a durable bearing portion on the shaft that the bearing portion be harder than the ordinary shafts. It therefore is an object of this invention to provide a shaft with an extremely hard bearing portion in the form of a thin layer of electrolytically deposited metal upon the main body of the shaft.

It is also an object of this invention to provide a bearing construction which has a lower co-efficient of friction than other water lubricated bearings. In this connection one of the bearing surfaces will be formed of rubber and the other of chromium and by reducing the co-efficient of friction of the bearing surfaces more economical operation results.

It is a further object of this invention to provide a bearing portion on a line shaft which is formed of extremely hard material and which forms what may be termed a land on the shaft the shoulders or ends of which will function to tend to deflect and circulate away from the bearing region any sand particles carried by the pumped fluid, thereby minimizing the amount of sand particles which may enter the bearing region.

It is also an object of this invention to provide a line shaft for deep well turbine pumps which is corrosive-proof throughout its entire length and which has bearing portions formed thereon of an extremely hard material, the shaft being designed for use in combination with rubber bearing sleeves.

To accomplish the above objects, I provide a bearing construction which embodies a thin layer of an extremely hard electrolytically deposited metal, preferably chromium, on the shaft in combination with a resilient rubber sleeve bearing. I have found that chromium plating is porous to the extent that when submerged in water over a period of time the water, especially if any salts are in solution, will penetrate the chromium and cause rusting or corrosion of the body upon which the chromium is applied, if that body is iron or steel or other non-rust-proof material. Corrosion of the body upon which the chromium is applied will eventually tend to cause the chromium to flake off. Therefore, it is a particular object of this invention to provide a construction wherein the chromium is applied over an underlay material of rust-proof or non-corrosive material and thereby provide a bearing surface of chromium which will remain in place practically indefinitely.

These and other objects will be apparent from the drawing and the following description thereof. Referring to the drawing, which is for illustrative purposes only;

Fig. 1 is a fragmentary sectional elevation of the discharge conduit of a pump showing an open-line shaft embodying the invention;

Fig. 2 is an elevation of a shaft section showing the bearing material on the shaft in section;

Fig. 3 is an elevation of a shaft section showing another form of the invention in section;

Fig. 4 is an elevation partly in section of a shaft of another form of the invention; and Fig. 5 is an elevation of a shaft section showing another form of the invention in section.

More particularly describing the invention, in Fig. 1, reference numeral 11 generally indicates the discharge conduit of a deep well turbine pump which may be supported at the surface of the ground in any ordinary manner and which extends downwardly to the impeller housing (not shown). Radially supported in the conduit is a shaft 12 which is provided with couplings 13. Reference numeral 14 generally indicates the rubber bearings used to support the shaft and these comprise a rubber sleeve 15 forming the bearing proper supported in a spider 16.

The shaft 12 has been shown as having enlarged bearing portions 18 thereon for engagement with the rubber sleeves 15. The construction of these enlarged bearing portions 18 may take several forms as will subsequently be described, however, in each form the outer bearing surface of the bearing portion is formed of chromium.

Referring to Fig. 2 there is shown one form of the invention in which the bearing portion 18 is formed of a thin layer 20 of an extremely hard electrolytically deposited metal, preferably chromium, on the steel shaft 12 which has first been ground to the desired diameter and smoothness. A thin layer of chromium is used because it adheres more perfectly to the shaft and does not tend to flake off, thick layers having this tendency. A thin layer is also preferred because it provides a smooth bearing surface which is concentric with the shaft upon which it is deposited and does not have undesirable irregularities or roughness. A thick layer, on the other hand, is more uneven and rough and requires buffing or grinding to provide a smooth bearing surface. Because of the extreme hardness of the chromium, grinding or buffing is an expensive operation and is to be avoided. Another advantage of a thin layer is that it is less porous and will better protect the shaft from corrosion.

By a "thin" layer is meant that the thickness of the coating is between .00075 and .003 of an inch or approximately so. While the above dimension limitations are preferable, it should be understood that this invention contemplates generally the use of chromium as a bearing surface for use with a bearing surface of resilient rubber and it is not intended to limit the invention to the exact dimensions set forth herein.

By referring to Figs. 1 and 2 it should be apparent that the bearing portion 18 of the shaft 12 extends radially beyond the main portion of the shaft so that the land at its ends forms edges or shoulders 18' which have a slight impeller effect when the shaft is rotating and tend to deflect the sand laden water, especially the sand particles therein, away from the ends of the bearing and thereby prevent the entrance into the bearing of a great deal of sand which would otherwise enter the bearing.

In Fig. 3 there is shown another form of the invention wherein the chromium here designated by reference numeral 20a, is deposited on a layer 21 of nickel. This construction is superior to the above outlined construction shown in Fig. 2 for the reason that the nickel prevents the corrosion and rusting of the shaft in the region where it is applied. In this connection, it should be noted as above mentioned that chromium is porous to a certain degree and will in time, if directly applied to a steel shaft, permit of the corrosion or rusting of the shaft beneath the region where the chromium is applied.

For best results the underlay layer 21 of nickel should be preferably between .00025 of an inch and .001 of an inch. The nickel is preferably buffed before the chromium is deposited. The thickness of the chromium layer in this instance should be between .00075 and .003 of an inch to secure the best results. If the above dimensions are adhered to a smooth bearing surface is obtained without any grinding of the chromium and there is no tendency for the nickel or chromium to flake off. If the nickel coating is too thin it will not properly protect the shaft while if it is too thick there is a loss of bond.

With the construction shown in Fig. 3 the nickel underlay protects the shaft from rusting or from otherwise corroding and therefore there is no danger of the nickel and consequently the chromium scaling off as there is in the form of the invention shown in Fig. 2 after long use. The chromium of course protects against abrasion.

In Fig. 4 there is shown a form of the invention in which nickel and chromium are used as pointed out in the description of Fig. 3 except that in this form of the invention there is provided a shaft which is entirely corrosive resistant and which is also provided with bearing lands or bearing portions which have a bearing surface of an extremely hard material such as chromium.

The shaft 12a is entirely covered with a coating of nickel 21a. The thickness of this nickel layer is preferably between .00025 and .001 of an inch, it only being necessary that the coat be sufficiently thick to protect the shaft from rusting or corrosion. This shaft, which may be of a plurality of sections as shown, is provided with bearing portions 18 which comprise a thin layer 20b of electrolytically deposited chromium. In this instance the layer of chromium should be between .00075 and .003 of an inch in thickness.

This form of the invention provides a shaft which is entirely corrosion proof and which also embodies the chromium lands or bearing portions which are adapted to be used in conjunction with rubber bearings. The chromium bearing portions form in effect lands, the edges of which tend to deflect the sand particles carried by the pumped fluid away from the bearing region and thereby prevent to a great extent the entrance of sand particles to the bearing surfaces.

In Fig. 5 there is shown another form of the invention in which the shaft 12b is provided with an annular groove 25 which is adapted to receive a sleeve 26 of corrosive-proof metal such as Monel metal or stainless steel. The sleeve 26 is swaged into place in the groove so that preferably its outer surface will be flush with the outer surface of the shaft as shown in the drawing although this is not essential and the sleeve might extend beyond the surface of the shaft if desired. The thickness of this sleeve may be approximately $\frac{1}{16}$ of an inch or such thickness as will adhere tightly against turning in the recess when the shaft is in operation.

Over the sleeve there is applied a coating 20c of chromium. It has been found that the thickness of chromium applied over Monel metal or stainless steel should be greater than when applied over nickel. This is particularly true in the case of Monel metal which is softer than either stainless steel or electrolytically deposited nickel and the thicker coating is required because it is necessary to give the chromium rigidity. Preferably, therefore, the thickness of the chromium coating should be between .001 and .003 of an inch, although it might be applied slightly thicker, if desired.

With the construction outlined immediately above there is provided a bearing portion of chromium which can have no tendency to flake off because it is applied to an undercoat of non-corrosive metal.

While throughout the specification reference has been made to chromium it is contemplated that some other electrolytically deposited metal having a hardness greatly in excess of steel or the like might be used.

While the invention has been specifically described with reference to certain preferred forms it is not intended to thereby limit the invention but it is intended to cover such modifications as come within the scope of the claims.

I claim as my invention:

1. In an open line shaft bearing, the combination of: a steel line shaft; a relatively thin layer of chromium on said shaft in the zone of said bearing; and a soft rubber sleeve surrounding said zone of said shaft, the portion of said shaft having said chromium layer thereon being journaled in said sleeve.

2. In an open line shaft bearing, the combination of: a steel line shaft; means providing a bearing surface on said shaft within the zone of said bearing, said means including an externally exposed layer of chromium; and a soft rubber sleeve surrounding said zone of said shaft, the portion of said shaft having said chromium layer thereon being journaled in said sleeve.

3. In an open line shaft bearing, the combination of: a steel line shaft; means providing a bearing surface on said shaft in the zone of said bearing, said means including an underlayer of a relatively hard and relatively non-porous corrosion-resistant metal and an outer layer of chromium; and a soft rubber sleeve surrounding said zone of said shaft, the chromium surfaced portion of said shaft journalling in said sleeve.

4. In an open line shaft bearing, the combination of: a steel line shaft; a sleeve of relatively non-porous and non-corrosive metal applied to said shaft within the zone of said bearing so as to be substantially integral with said shaft; a layer of chromium on the exterior of said sleeve; and a soft rubber bushing surrounding said zone of said shaft, the portion of the sleeve having said chromium layer thereon being journaled in said bushing.

JAMES M. HAIT.